(12) United States Patent  
DeLuca et al.

(10) Patent No.: US 9,820,097 B1
(45) Date of Patent: Nov. 14, 2017

(54) GEOFENCE LOCATION DETECTION

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/399,221

(22) Filed: Jan. 5, 2017

(51) Int. Cl.
*H04W 4/02* (2009.01)

(52) U.S. Cl.
CPC .......... *H04W 4/021* (2013.01); *H04W 4/023* (2013.01)

(58) Field of Classification Search
CPC .................................................. H04W 4/021
See application file for complete search history.

(56) References Cited

U.S. PATENT DOCUMENTS

| | | | |
|---|---|---|---|
| 7,343,317 B2 | 3/2008 | Jokinen et al. |
| 7,912,630 B2 | 3/2011 | Alewine et al. |
| 8,812,027 B2 | 8/2014 | Obermeyer et al. |
| 9,043,329 B1 | 5/2015 | Patton et al. |
| 9,060,248 B1 | 6/2015 | Coulombe et al. |
| 9,100,795 B2 | 8/2015 | Sartipi et al. |
| 9,194,955 B1 | 11/2015 | Fahrner et al. |
| 9,226,105 B2 | 12/2015 | Turgman et al. |
| 9,363,221 B1 | 6/2016 | Ozog |
| 9,736,636 B1 | 8/2017 | DeLuca et al. |
| 9,756,607 B1 | 9/2017 | DeLuca |
| 2008/0139181 A1 | 6/2008 | Lokshin |
| 2008/0248815 A1 | 10/2008 | Busch |
| 2008/0312946 A1 | 12/2008 | Valentine et al. |
| 2009/0164118 A1 | 6/2009 | Breen |
| 2009/0197582 A1 | 8/2009 | Lewis et al. |
| 2009/0258636 A1 | 10/2009 | Helvick |
| 2010/0161207 A1 | 6/2010 | Do |
| 2011/0093339 A1 | 4/2011 | Morton |

(Continued)

FOREIGN PATENT DOCUMENTS

| | | |
|---|---|---|
| CN | 1460373 | 12/2003 |
| WO | 2012135155 | 10/2012 |

OTHER PUBLICATIONS

Bareth, Ulrich et al.; geoXmart—A Marketplace for Geofence-Based Mobile Services; 2010 34th Annual IEEE Computer Software and Applications Conference; Jul. 19-23, 2010; pp. 101-106.

(Continued)

*Primary Examiner* — Christopher M Brandt
(74) *Attorney, Agent, or Firm* — Schmeiser, Olsen & Watts; John R. Pivnichny

(57) ABSTRACT

A method and system for improving geofence location detection is provided. The method includes detecting a geofence and determining that a first set of users are traveling together. The first set of users comprises a first user and a second user. Sensors detect a first mobile device of the first user has triggered the geofence event and that a second mobile device of the second user has not triggered the geofence event. In response, it is determined that the second mobile device is currently unavailable and an action associated with the second user triggering the geofence event is automatically executed as if the second user had triggered the geofence event.

20 Claims, 4 Drawing Sheets

(56) References Cited

U.S. PATENT DOCUMENTS

| | | |
|---|---|---|
| 2011/0320259 A1 | 12/2011 | Roumeliotis et al. |
| 2012/0054028 A1 | 3/2012 | Tengler et al. |
| 2012/0271715 A1 | 10/2012 | Morton et al. |
| 2012/0310741 A1 | 12/2012 | Uyeki et al. |
| 2013/0045760 A1 | 2/2013 | Obermeyer et al. |
| 2013/0267253 A1 | 10/2013 | Case et al. |
| 2013/0326137 A1 | 12/2013 | Bilange et al. |
| 2013/0332274 A1 | 12/2013 | Faith et al. |
| 2014/0057648 A1 | 2/2014 | Lyman et al. |
| 2014/0155094 A1 | 6/2014 | Zises |
| 2014/0162692 A1 | 6/2014 | Li et al. |
| 2014/0164118 A1 | 6/2014 | Polachi |
| 2014/0279015 A1 | 9/2014 | Root et al. |
| 2014/0337123 A1 | 11/2014 | Nuernberg et al. |
| 2014/0379430 A1 | 12/2014 | Kritt et al. |
| 2015/0011237 A1 | 1/2015 | Obermeyer et al. |
| 2015/0024773 A1* | 1/2015 | Li .................. H04W 4/021 455/456.1 |
| 2015/0099461 A1 | 4/2015 | Holden et al. |
| 2015/0120453 A1 | 4/2015 | Lee et al. |
| 2015/0199704 A1 | 7/2015 | Gottesman et al. |
| 2015/0220993 A1 | 8/2015 | Bente |
| 2015/0269167 A1 | 9/2015 | Tseng |
| 2015/0269624 A1 | 9/2015 | Cheng et al. |
| 2015/0271638 A1 | 9/2015 | Menayas et al. |
| 2015/0271639 A1 | 9/2015 | Ziskind et al. |
| 2015/0341747 A1 | 11/2015 | Barrand et al. |
| 2015/0365796 A1 | 12/2015 | Toni |
| 2016/0007151 A1 | 1/2016 | Birch et al. |
| 2016/0034961 A1 | 2/2016 | May et al. |
| 2016/0057573 A1 | 2/2016 | Chang et al. |
| 2016/0057576 A1 | 2/2016 | Kessler et al. |
| 2016/0061609 A1 | 3/2016 | Dickey et al. |
| 2016/0066141 A1 | 3/2016 | Jain et al. |
| 2016/0080486 A1 | 3/2016 | Ram et al. |
| 2016/0183052 A1 | 6/2016 | Qiu |
| 2016/0253710 A1 | 9/2016 | Publicover et al. |
| 2017/0019761 A1 | 1/2017 | Heo |
| 2017/0142548 A1* | 5/2017 | Buskirk .............. H04W 4/021 |

OTHER PUBLICATIONS

Friedman, Mark J.; List of IBM Patents or Patent Applications Treated as Related; Jan. 5, 2017; 1 page.
Levent Besik and Alessio Pace, Systems and Methods of Managing Geofences, Technical Disclosure Commons, Apr. 22, 2016, pp. 10.
Friedman, Mark J.; Updated List of IBM Patents or Patent Applications Treated as Related; Feb. 1, 2017; 1 page.
Ahmed, Nasimuddim et al.; SmartEvacTrak: a People Counting and Coarse-Level Localization Solution for Efficient Evacuation of Large Buildings; 2015 IEEE International Conference on Pervasive Computing and Communication Workshops (PerCom Workshops); Mar. 23-27, 2015; pp. 372-377.
Chu, Hon et al.; I am a Smartphone and I Know My User is Driving; 2014 Sixth International Conference on Communication Systems and Networks (COMSNETS); Jan. 6-10, 2014; 8 pages.
Friedman, Mark J.; List of IBM Patents or Patent Applications Treated as Related; Sep. 8, 2017; 1 page.
Roy, Nirupam et al.; I am a Smartphone and I can Tell my User's Walking Direction; Proceedings of the 12th Annual International conference on Mobile Systems, Applications and Services; Jun. 16-19, 2014; pp. 329-342.
Zin, M.S.I.M et al.; Development of Auto-Notification Application for Mobile Device using Geofencing Technique; Journal of Telecommunication, Electronic and Computer Engineering (Jtec) vol. 7, No. 2, Jul.-Dec. 2015, pp. 169-173.
Friedman, Mark J.; List of IBM Patents or Patent Applications Treated as Related; Oct. 5, 2017; 1 page.
Hendrix, Phil, Dr.; Watch this Space—How Mobile and Beacons Are Enhancing the Value of Out-of-Home Media for Advertisers and Mobile App Partners; A whitpaper sponsored by Gimbal; Aug. 2015; 23 pages.
Mell, Peter et al.; The NIST Definition of Cloud Computing; National Institute of Standards and Technology; Special Publication 800-145; Sep. 2011; 7 pages.
Neilsen Norman Group; Evidence-Based user Experience Research, Training and Consulting; https://www.nngroup.com; retrieved from the Internet Sep. 28, 2017; 5 pages.
Ruckus Wireless; Location: The New Battlefield for Business & Digital Innovation; www.ruckuswireless.com; 2014; 9 pages.

* cited by examiner

GEOFENCE LOCATION DETECTION

FIELD

The present invention relates generally to a method for determining a user location based on a geofence triggering process and in particular to a method and associated system for improving geofence location detection technology by executing actions based on at least one mobile device of a group of multiple devices triggering a geofence event.

BACKGROUND

Accurately determining user locations based on input from a user typically includes an inaccurate process with little flexibility. Analyzing multiple user locations with respect to external communications may include a complicated process that may be time consuming and require a large amount of resources. Accordingly, there exists a need in the art to overcome at least some of the deficiencies and limitations described herein above.

SUMMARY

In one embodiment, the present invention provides a geofence location detection improvement method comprising: determining, by a processor of a hardware device, a first geofence; determining, by the processor, that a first set of users are traveling together, wherein the first set of users comprises a first user and a second user; detecting, by the processor via a plurality of sensors, that the first set of users trigger a geofence event; first determining, by the processor, that a first mobile device of the first user has triggered the geofence event; second determining, by the processor, that a second mobile device of the second user has not triggered the geofence event; third determining, by the processor based on results of the first determining and the second determining, that the second mobile device is currently unavailable; and automatically executing, by the processor based on the third determining, an action associated with the second user triggering the geofence event as if the second user had triggered the geofence event.

In another embodiment, the present invention provides a computer program product, comprising a computer readable hardware storage device storing a computer readable program code, the computer readable program code comprising an algorithm that when executed by a processor of a hardware device implements a geofence location detection improvement method, the method comprising: determining, by the processor, a first geofence; determining, by the processor, that a first set of users are traveling together, wherein the first set of users comprises a first user and a second user; detecting, by the processor via a plurality of sensors, that the first set of users trigger a geofence event; first determining, by the processor, that a first mobile device of the first user has triggered the geofence event; second determining, by the processor, that a second mobile device of the second user has not triggered the geofence event; third determining, by the processor based on results of the first determining and the second determining, that the second mobile device is currently unavailable; and automatically executing, by the processor based on the third determining, an action associated with the second user triggering the geofence event as if the second user had triggered the geofence event.

In another embodiment, the present invention provides a hardware device comprising a processor coupled to a computer-readable memory unit, the memory unit comprising instructions that when executed by the processor executes a geofence location detection improvement method comprising: determining, by the processor, a first geofence; determining, by the processor, that a first set of users are traveling together, wherein the first set of users comprises a first user and a second user; detecting, by the processor via a plurality of sensors, that the first set of users trigger a geofence event; first determining, by the processor, that a first mobile device of the first user has triggered the geofence event; second determining, by the processor, that a second mobile device of the second user has not triggered the geofence event; third determining, by the processor based on results of the first determining and the second determining, that the second mobile device is currently unavailable; and automatically executing, by the processor based on the third determining, an action associated with the second user triggering the geofence event as if the second user had triggered the geofence event.

The present invention advantageously provides a simple method and associated system capable of accurately determining user locations.

DETAILED DESCRIPTION

Figure 1:
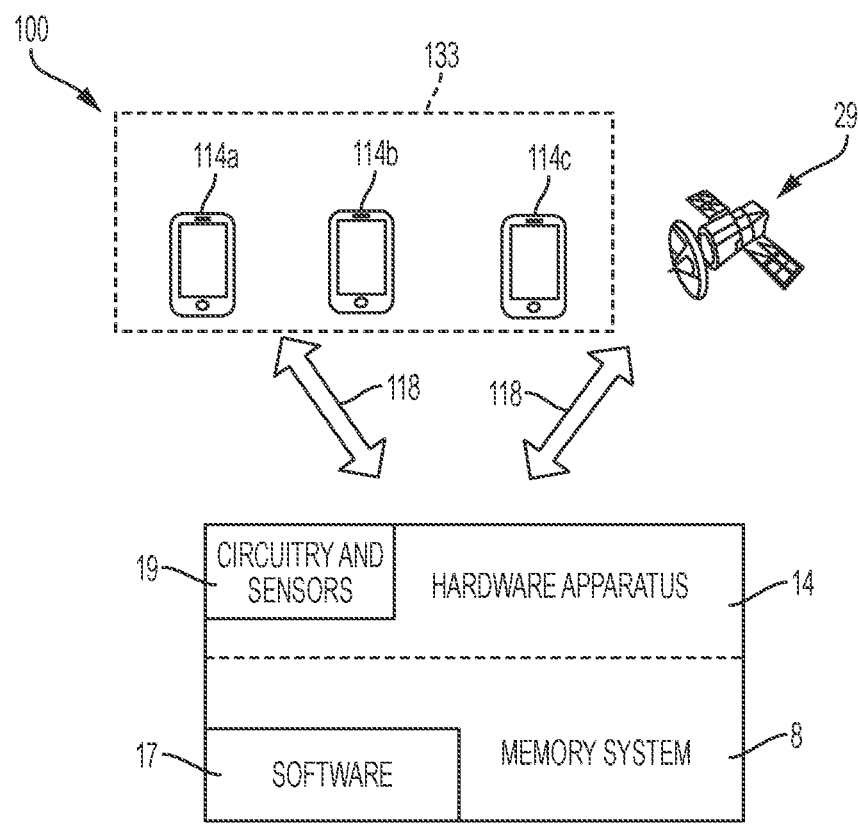
FIG. 1 illustrates a system for improving geofence location detection technology by executing actions based a mobile device of triggering a geofence event, in accordance with embodiments of the present invention.

FIG. 1 illustrates a system 100 for improving geofence location detection technology by executing actions based a mobile device of triggering a geofence event, in accordance with embodiments of the present invention. A geofence is defined herein as a feature in a software program and/or hardware circuitry using a global positioning system (GPS) or radio frequency identification (RFID) to define geographical boundaries. A geofence may include a virtual barrier. A geofence event is defined herein as an alert trigger executed based on a GPS enabled device (e.g., a mobile device) entering or leaving a geofenced area defined by a user. System 100 enables a process for determining a location of a user based on a crowd based triggering and/or invoking process with respect to a geofence. The process includes:

1. Determining a location of a first user based detected context of an event. For example, determining (via a travel plan) that the first user is travelling (and in a same vicinity) with a second user carrying a mobile device.
2. Enabling (by the second user) a process for invoking a geofence upon reaching a destination. System 100 detects that the mobile device of the second user has breached the geofence and determines (based on an assumption) that the first user has additionally breached the geofence. In response, an associated action is executed. For example, a notification or alert may be transmitted to an associated party.

System 100 of FIG. 1 includes mobile devices 114*a*-114*c* and a satellite system 29 in communication with a hardware apparatus 14 via a network 118. Mobile devices 114*a*-114*c* are located within a geofence 133. Mobile devices 114*a*-114*c* and hardware apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, mobile devices 114*a*-114*c* and hardware apparatus 14 may each comprise a specialized hardware device comprising specialized (non-generic) hardware and circuitry (i.e., specialized discrete non-generic analog, digital, and logic based circuitry) for executing a process described with respect to FIGS. 1-4. The specialized discrete non-generic analog, digital, and logic based circuitry may include proprietary specially designed components (e.g., a specialized integrated circuit such as circuitry and sensors 19 (as described, infra) designed for only implementing an automated process for executing actions based a mobile device of triggering a geofence event). Hardware apparatus 14 includes a memory system 8, software 17, and circuitry and sensors 19. The memory system 8 may include a single memory system. Alternatively, the memory system 8 may include a plurality of memory systems. Mobile devices 114*a*-114*c* may comprise any type of hardware devices (comprising embedded circuitry for only performing an automated process for executing actions based a mobile device of triggering a geofence event) including, inter alia, a smart phone, a PDA, a tablet computer, a laptop computer, etc. Circuitry and sensors 19 may include any type of sensors including, inter alia, GPS sensors, video recording devices, optical sensors, weight sensors, temperature sensors, pressure sensors, etc. Additionally, mobile devices 114*a*-114*c* may comprise any of the aforementioned sensors for enabling an automated process for executing actions based a mobile device of triggering a geofence event. Satellite system 29 may comprise a satellite and a hardware system for determining geographical coordinates.

System 100 of FIG. 1 enables the following implementation process for generating location assumptions with respect to a first user based on known location information of a second user determined to be traveling with the first user:

1. A geofence (intended to be invoked) such as geofence 133 is detected. For example, a geofence may be determined based on an arrival in a city via an airplane.
2. A set of users travelling together are determined based on the users traveling via a common mode of transportation. For example, traveling via a same: airplane, train, bus, taxi cab/ride sharing service, car pool, family vacations, tour bus, etc.
2. The set of users are determined to be maintaining a proximity to each other (e.g., user x and user y are located adjacent each other) for a specified threshold time period.
3. A first mobile device of a first user (of the set of users) is determined to breach the geofence and in response, all additional mobile devices of the additional users of the set of users are assumed to additionally trigger the geofence without actually breaching the geofence. For example, some of the additional mobile devices may not have breached the geofence as they may be disabled due to: being offline or in airport mode, having a discharged battery, being left behind or forgotten, etc. Therefore, if it is determined that a second mobile device (of a second user of the set of users) did not trigger the geofence system 100 may execute the following processes associated with triggering the geofence:

1. Execution of actions in combination with a warning message indicating that the user (of the second device) is assumed to have breached the geofence.
2. Execution of actions in combination with a warning message and transmission of a confirmation message when the second device actually triggers the geofence.
2. Execution of actions in combination with a message indicating that additional users of the set of users have arrived at the geofence location.

Figure 2:
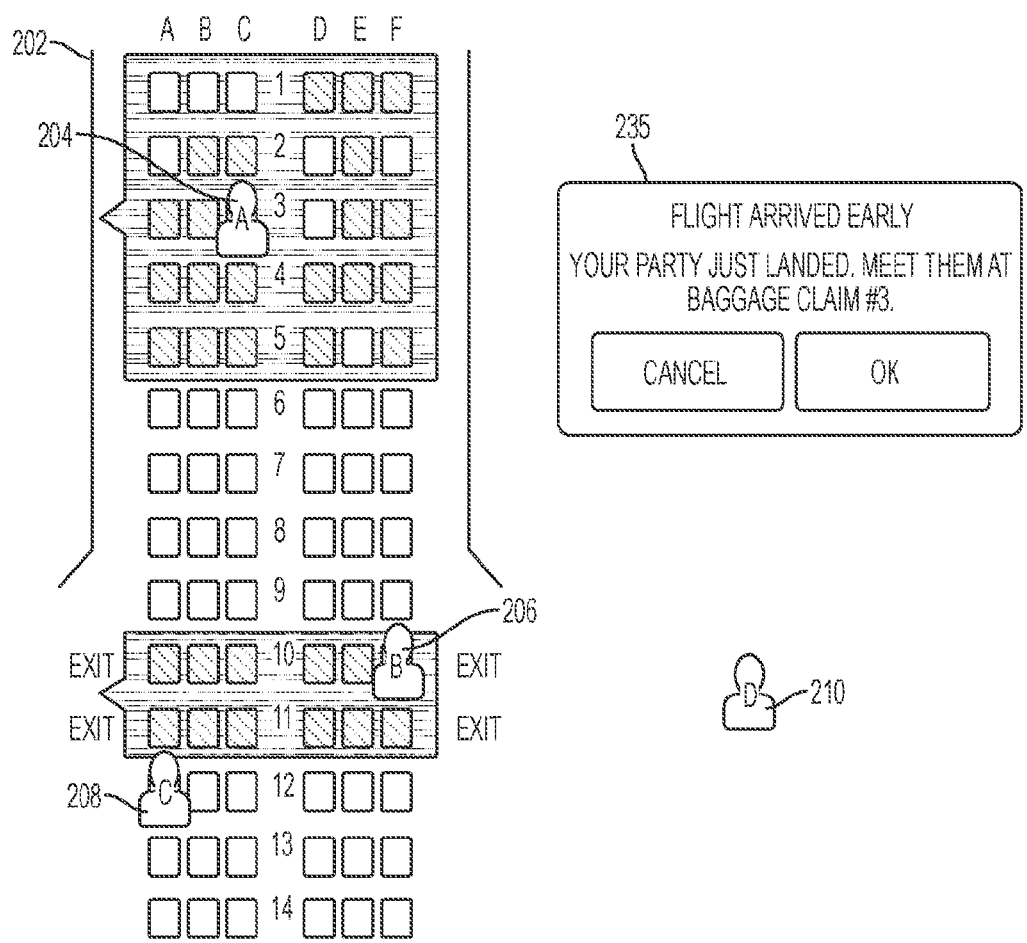
FIG. 2 illustrates an implementation example detailing a set of users traveling together on an airplane, in accordance with embodiments of the present invention.

FIG. 2 illustrates an implementation example detailing a set of users comprising a user 204, a user 206, and a user 208 traveling together on an airplane 202, in accordance with embodiments of the present invention. A user 210 lives in a location A and user 204 (e.g., user 210's mother) is flying into location A via airplane 202 to visit user A. During the flight, user 204 uses his/her mobile device A to watch an inflight movie and consequently a battery in the mobile device A discharges. Additionally, the flight into location A arrives 30 minutes early and user 204 is unable to notify user 210 that he/she has arrived at location A. In response, system 100 determines that user 206 (i.e., on the same flight as user 204) powered up his/her mobile device B and triggered a geofence associated with a location A arrival. Additionally, system 100 executes a query to determines that user 204 is likely to have also arrived and therefore system 100 triggers a notification (e.g., via a graphical user interface 235) to user 210 indicating that user 204 has arrived at location A early thereby allowing user 210 to locate user 204 despite mobile device A comprising a discharged battery. Additionally, a user 208 is determined to be on the same flight and forgot to turn his/her mobile device C on when the flight landed. In response, system 100, alerts an additional user (i.e., meeting user 208 at the airport for pickup) user 208 has arrived early based on mobile device B (of user 206) triggering the geofence.

Figure 3:
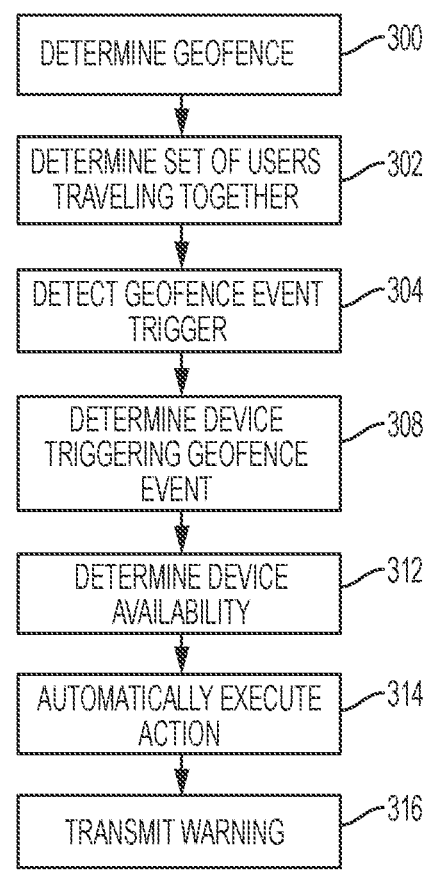
FIG. 3 illustrates an algorithm detailing a process flow enabled by the system of FIG. 1 for improving geofence location detection technology by executing actions based a mobile device of triggering a geofence event, in accordance with embodiments of the present invention.

FIG. 3 illustrates an algorithm detailing a process flow enabled by system 100 of FIG. 1 for improving geofence location detection technology by executing actions based a mobile device of triggering a geofence event, in accordance with embodiments of the present invention. Each of the steps in the algorithm of FIG. 3 may be enabled and executed in any order by a computer processor(s) or any type of specialized hardware executing specialized computer code. In step 300, a geofence (associated with a specified location) is detected and determined. In step 302, a first set of users (including a first user and a second user) are determined to be traveling together. Determining that the first set of users are traveling together may include the following processes:

1. Detecting that the first user is located within a specified proximity from the second user for a specified period of time exceeding a specified threshold time.
2. Detecting that the first user and the second user are currently traveling via a common mode of transportation.

In step 304, it is detected that the first set of users triggers a geofence event. The detection process may be enabled via sensors (e.g., of mobile devices of the first set of users). The geofence event may comprise, inter alia, a geofence entry event, a geofence dwell event, a geofence exit event, etc. In step 308, it is determined that a first mobile device of the first user has triggered the geofence event and that a second mobile device of the second user has not triggered the geofence event. In step 312, it is determined (based on results of step 308) that the second mobile device is currently unavailable. Determining that the second mobile device is currently unavailable may indicate an unavailability event including, inter alia, the second mobile device being misplaced, the second mobile device being disabled from a power source, the second mobile device not being able to provide geolocation information, the second mobile device not being able to access a network, etc. In step 314, an action is automatically executed based on results of step 312. The action is associated with the second user triggering the geofence event as if the second user had triggered the geofence event. The action may include performing a task based on the geofence event, notifying a third user based on the geofence event, etc. In step 316, a warning in combination with completion of the task (of step 314) is transmitted to a third user with a third mobile device. The warning indicates that the second mobile device has not triggered the geofence event and that the second user has triggered the geofence event based on results of step 308.

Figure 4:
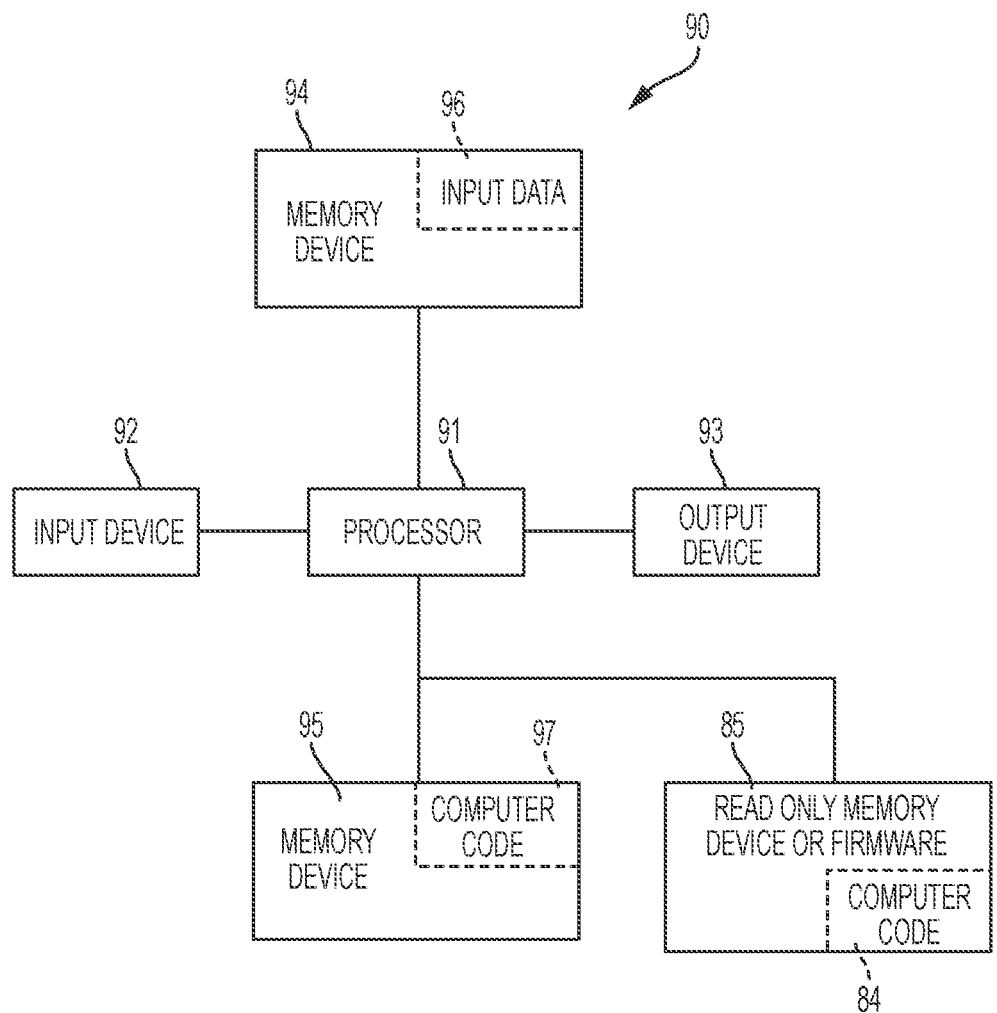
FIG. 4 illustrates a computer system used by the system of FIG. 1 for enabling a process for improving geofence location detection technology by executing actions based a mobile device of triggering a geofence event, in accordance with embodiments of the present invention.

FIG. 4 illustrates a computer system 90 (e.g., hardware devices 114a-114c and hardware apparatus 14) used by or comprised by the system of FIG. 1 for improving geofence location detection technology by executing actions based a mobile device of triggering a geofence event, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for enabling a process for improving geofence location detection technology by executing actions based a mobile device of triggering a geofence event. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for improving geofence location detection technology by executing actions based a mobile device of triggering a geofence event. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving geofence location detection technology by executing actions based a mobile device of triggering a geofence event. In another embodiment, the invention provides a business method that performs the process steps of the invention on a subscription, advertising, and/or fee basis. That is, a service supplier, such as a Solution Integrator, could offer to enable a process for improving geofence location detection technology by executing actions based a mobile device of triggering a geofence event. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A geofence location detection improvement method comprising:
   determining, by a processor of a hardware device, a first geofence;
   determining, by said processor, that a first set of users are traveling together, wherein said first set of users comprises a first user and a second user;
   detecting, by said processor via a plurality of sensors, that said first set of users trigger a geofence event;
   first determining, by said processor, that a first mobile device of said first user has triggered said geofence event;
   second determining, by said processor, that a second mobile device of said second user has not triggered said geofence event;
   third determining, by said processor based on results of said first determining and said second determining, that said second mobile device is currently unavailable; and automatically executing, by said processor based on said third determining, an action associated with the said second user triggering the geofence event as if the second user had triggered the geofence event.

2. The method of claim 1, wherein said determining that said first set of users are traveling together comprises:
detecting, by said processor via said first mobile device and said second mobile device, that said first user is located within a specified proximity from said second user for a specified period of time exceeding a specified threshold time.

3. The method of claim 1, wherein said determining that said first set of users are traveling together comprises:
detecting that said first user and said second user are currently traveling via a common mode of transportation.

4. The method of claim 1, wherein said geofence event comprises an event selected from the group consisting of a geofence entry event, a geofence dwell event, and a geofence exit event.

5. The method of claim 1, wherein said third determining that said second mobile device is currently unavailable indicates an unavailability event selected from the group consisting of said second mobile device being misplaced, said second mobile device being disabled from a power source, said second mobile device not being able to provide geolocation information, and said second mobile device not being able to access a network.

6. The method of claim 1, wherein said action comprises performing a task based on said geofence event or notifying a third user based on said geofence event.

7. The method of claim 6, further comprising:
transmitting, by said processor to a third user with a third mobile device, a warning in combination with completion of said task, wherein said warning indicates that said second mobile device has not triggered said geofence event and that said second user has triggered said geofence event based on results of said first determining.

8. The method of claim 1, further comprising:
providing at least one support service for at least one of creating, integrating, hosting, maintaining, and deploying computer-readable code in the hardware device, said code being executed by the computer processor to implement: said determining said first geofence, said determining that said first set of users are traveling together, said detecting, said first determining, said second determining, said third determining, and said automatically executing.

9. A computer program product, comprising a computer readable hardware storage device storing a computer readable program code, said computer readable program code comprising an algorithm that when executed by a processor of a hardware device implements a geofence location detection improvement method, said method comprising:
determining, by said processor, a first geofence;
determining, by said processor, that a first set of users are traveling together, wherein said first set of users comprises a first user and a second user;
detecting, by said processor via a plurality of sensors, that said first set of users trigger a geofence event;
first determining, by said processor, that a first mobile device of said first user has triggered said geofence event;
second determining, by said processor, that a second mobile device of said second user has not triggered said geofence event;
third determining, by said processor based on results of said first determining and said second determining, that said second mobile device is currently unavailable; and
automatically executing, by said processor based on said third determining, an action associated with the said second user triggering the geofence event as if the second user had triggered the geofence event.

10. The computer program product of claim 9, wherein said determining that said first set of users are traveling together comprises:
detecting, by said processor via said first mobile device and said second mobile device, that said first user is located within a specified proximity from said second user for a specified period of time exceeding a specified threshold time.

11. The computer program product of claim 9, wherein said determining that said first set of users are traveling together comprises:
detecting that said first user and said second user are currently traveling via a common mode of transportation.

12. The computer program product of claim 9, wherein said geofence event comprises an event selected from the group consisting of a geofence entry event, a geofence dwell event, and a geofence exit event.

13. The computer program product of claim 9, wherein said third determining that said second mobile device is currently unavailable indicates an unavailability event selected from the group consisting of said second mobile device being misplaced, said second mobile device being disabled from a power source, said second mobile device not being able to provide geolocation information, and said second mobile device not being able to access a network.

14. The computer program product of claim 9, wherein said action comprises performing a task based on said geofence event or notifying a third user based on said geofence event.

15. The computer program product of claim 9, wherein said method further comprises:
transmitting, by said processor to a third user with a third mobile device, a warning in combination with completion of said task, wherein said warning indicates that said second mobile device has not triggered said geofence event and that said second user has triggered said geofence event based on results of said first determining.

16. A hardware device comprising a processor coupled to a computer-readable memory unit, said memory unit comprising instructions that when executed by the processor executes a geofence location detection improvement method comprising:
determining, by said processor, a first geofence;
determining, by said processor, that a first set of users are traveling together, wherein said first set of users comprises a first user and a second user;
detecting, by said processor via a plurality of sensors, that said first set of users trigger a geofence event;
first determining, by said processor, that a first mobile device of said first user has triggered said geofence event;
second determining, by said processor, that a second mobile device of said second user has not triggered said geofence event;
third determining, by said processor based on results of said first determining and said second determining, that said second mobile device is currently unavailable; and automatically executing, by said processor based on said third determining, an action associated with the said second user triggering the geofence event as if the second user had triggered the geofence event.

17. The hardware device of claim 16, wherein said determining that said first set of users are traveling together comprises:
   detecting, by said processor via said first mobile device and said second mobile device, that said first user is located within a specified proximity from said second user for a specified period of time exceeding a specified threshold time.

18. The hardware device of claim 16, wherein said determining that said first set of users are traveling together comprises:
   detecting that said first user and said second user are currently traveling via a common mode of transportation.

19. The hardware device of claim 16, wherein said geofence event comprises an event selected from the group consisting of a geofence entry event, a geofence dwell event, and a geofence exit event.

20. The hardware device of claim 16, wherein said third determining that said second mobile device is currently unavailable indicates an unavailability event selected from the group consisting of said second mobile device being misplaced, said second mobile device being disabled from a power source, said second mobile device not being able to provide geolocation information, and said second mobile device not being able to access a network.

* * * * *